United States Patent [19]
Gottberg et al.

[11] Patent Number: 5,996,339
[45] Date of Patent: Dec. 7, 1999

[54] DEVICE FOR CATALYTIC PURIFICATION OF EXHAUST GASES

[75] Inventors: Ingemar Gottberg, Västra Frölunda; Kurt Weber, Ytterby, both of Sweden

[73] Assignee: AB Volvo, Sweden

[21] Appl. No.: 08/913,346

[22] PCT Filed: Feb. 27, 1996

[86] PCT No.: PCT/SE96/00247

§ 371 Date: Nov. 24, 1997

§ 102(e) Date: Nov. 24, 1997

[87] PCT Pub. No.: WO96/27078

PCT Pub. Date: Sep. 6, 1996

[30] Foreign Application Priority Data

Mar. 1, 1995 [SE] Sweden ................................ 9500748

[51] Int. Cl.$^6$ .................................................... F01N 3/10
[52] U.S. Cl. ............................. 60/299; 60/302; 60/301; 422/180
[58] Field of Search ............................ 60/299, 300, 276, 60/302, 301; 422/180, 177, 171, 174

[56] References Cited

U.S. PATENT DOCUMENTS

| 3,785,781 | 1/1974 | Hervert et al. ............................ 23/288 |
| 4,987,034 | 1/1991 | Hitachi et al. ........................... 428/593 |
| 5,157,921 | 10/1992 | Ito et al. .................................... 60/274 |
| 5,332,554 | 7/1994 | Yasaki et al. ............................ 422/180 |
| 5,403,559 | 4/1995 | Swars ....................................... 422/180 |
| 5,611,198 | 3/1997 | Lane et al. ................................ 60/299 |

FOREIGN PATENT DOCUMENTS

| 0 420 462 | 4/1991 | European Pat. Off. . |
| 0 420 462 A2 | 4/1991 | European Pat. Off. . |
| 0 483 708 A1 | 5/1992 | European Pat. Off. . |
| 3823550 | 1/1990 | Germany . |
| 9313593 | 1/1994 | Germany . |
| 5-263640 | 10/1993 | Japan ............................................ 3/36 |
| 1 405 068 | 9/1975 | United Kingdom . |
| 89/10470 | 11/1989 | WIPO . |
| WO 91/01178 | 2/1991 | WIPO . |
| 91/10048 | 7/1991 | WIPO . |
| 94/13938 | 6/1994 | WIPO . |

OTHER PUBLICATIONS

SAE Technical Paper Series, 950407, Advances in Durability and Performance of Ceramic Preconverter Systems, Int'l Congress and Exposition, Detroit, MI, unknown date.
Conference Information, 1995 SAE Int'l Congress and Exposition, Feb. 27–Mar. 2, 1995.
Automotive Engineering, SAE International, Sep. 1994, Convergence '94 Show Issue, Heated Catalytic Converter.
SAE Technical Paper Series, 950254, High Temperature Ultra Stable Close–Coupled Catalysts, International Congress and Exposition, Detroit, MI, unknown date.
SAE Technical Paper Series, 940465, Ultra–Low Power Electrically–Heated Catalyst System, International Congress and Exposition, Detroit, MI, unknown date.
State of California, Air Resources Board, Staff Report: Initial Statement of Reasons for Rulemaking, Ford Motor Company's Petition for Limited Relief from 1994/1995 On–Board Diagnostic II (OBD II) Provisions, May 21, 1993.

*Primary Examiner*—Edward K. Look
*Assistant Examiner*—Binh Tran
*Attorney, Agent, or Firm*—Lerner, David, Littenberg, Krumholz & Mentlik, LLP

[57] ABSTRACT

Catalyzers for purification of exhaust gases are disclosed including a housing, an inlet for supplying the exhaust gases to the housing, a first catalyzer within the housing adjacent to the inlet and a second catalyzer within the housing downstream of the first catalyzer, the first catalyzer having a smaller cross-sectional area than the second catalyzer, and the inlet being angled with respect to the longitudinal axis of the first catalyzer.

11 Claims, 3 Drawing Sheets

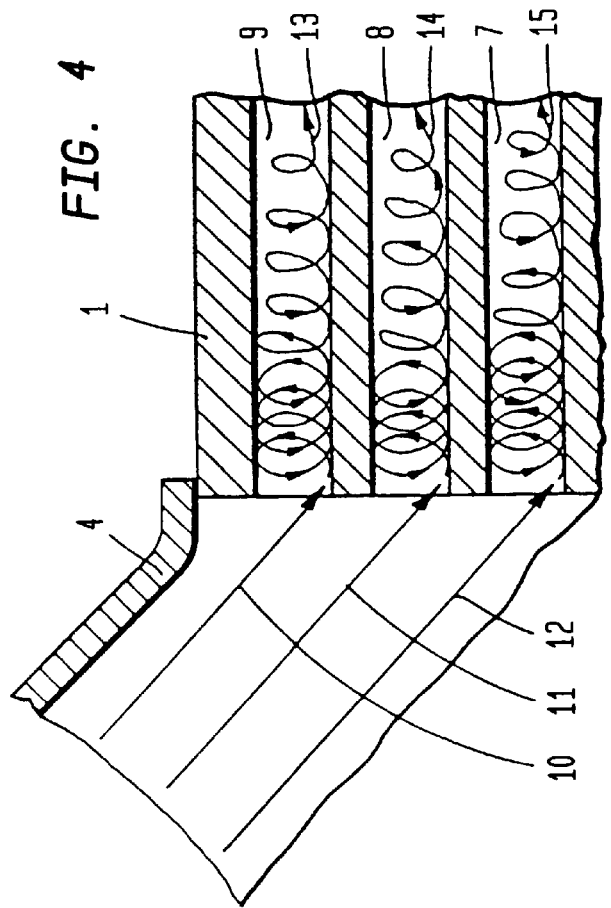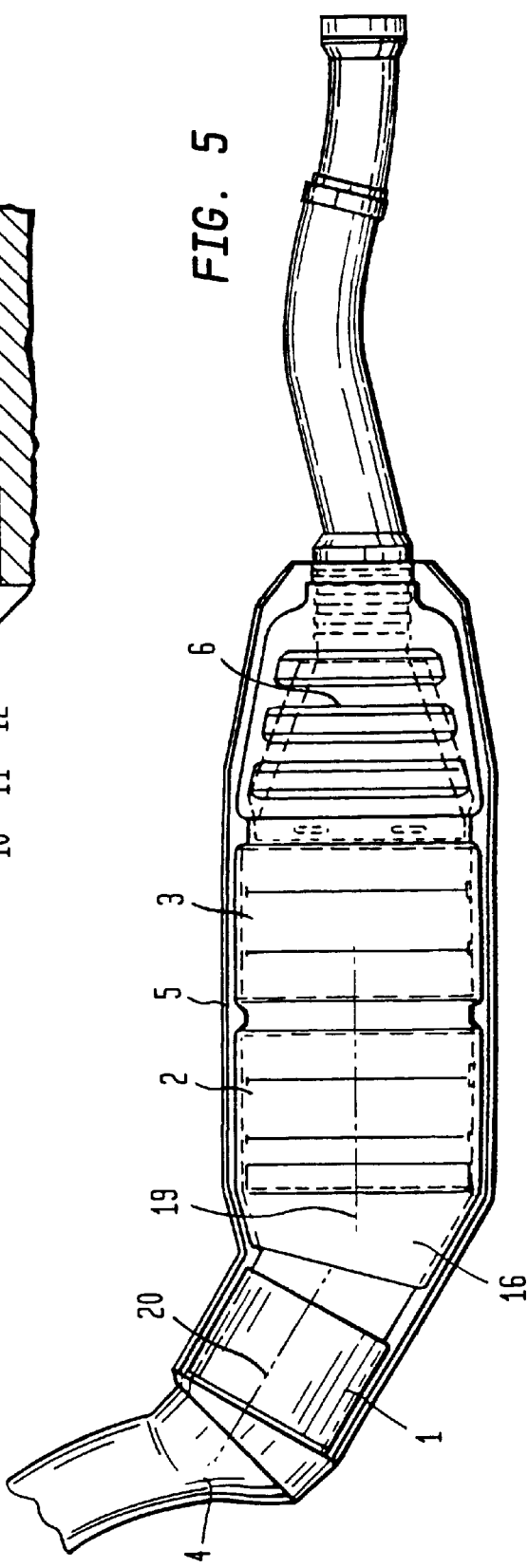

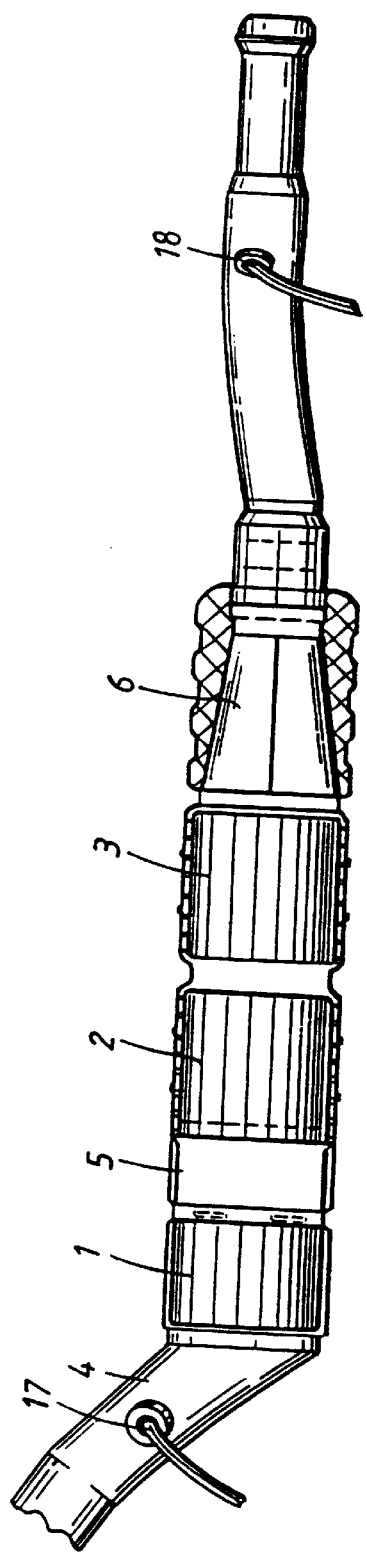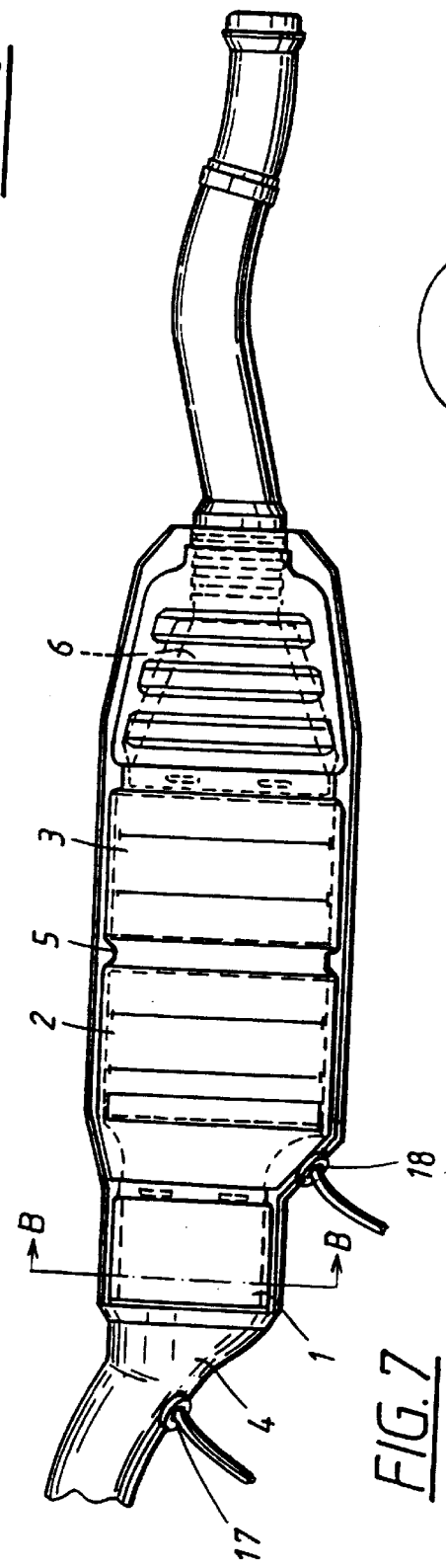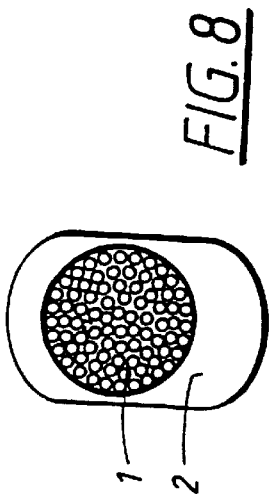

DEVICE FOR CATALYTIC PURIFICATION OF EXHAUST GASES

FIELD OF THE INVENTION

The present invention relates to a catalytic exhaust gas purification arrangement.

BACKGROUND OF THE INVENTION

Catalytic exhaust gas purifiers are often used in motor vehicles in order to purify the exhaust gases from the vehicle's engine. However, present catalytic converters (catalyzers) are not able to operate at full purification efficiency in connection with cold-starting of a vehicle. This problem can be overcome by arranging an additional, electrically-heatable start catalyzer in front of the ordinary catalyzer. By heating up the start catalyzer electrically, the warm-up time for the ordinary catalyzer can be shortened, which results in improved purification efficiency during cold starts. Such a catalyzer arrangement is shown in International Patent No. WO 80/10470.

A problem which occurs in connection with an electrically-heatable start catalyzer is that it requires a powerful electrical supply in order to be activated. This can, for example, be achieved by arranging an additional battery in the vehicle, which is however unnecessarily expensive and complicated. It is therefore desirable to have a catalyzer arrangement which is not dependent on an electrical supply, but which still produces a shortening of the main catalyzer's "ignition" time (the so-called "light-off" time), i.e. the time which elapses from starting the engine until the catalyzer is working at optimal purification efficiency. This should, in such a case, result in improved purification efficiency of the entire catalyzer arrangement.

In connection with conventional catalyzers, there is an additional problem in that the incoming exhaust gases impinge directly onto the catalyzer. This produces a turbulent flow immediately in front of the catalyzer, which leads to inefficient operation of the catalyzer as well as a comparatively high back-pressure, which is a disadvantage compounding the reduction in the efficiency of the catalyzer. One way of solving this problem is to direct the exhaust gases at an angle to the catalyzer, for instance in accordance with the disclosure in European Patent No. 420,462. This arrangement, however, presents a disadvantage in that it has relatively poor flow characteristics, since not only the inlet but also the outlet are angled with respect to the catalyzer.

A main object of the present invention is to solve the aforementioned problems and provide an improved arrangement for catalytic exhaust gas purification, in particular for shortening the light-off time of such an arrangement.

An additional object of the present invention is to achieve a correct measurement of the conversion efficiency of the aforementioned catalyzer arrangement, in order to provide information for a diagnosis of its operation. This allows an indication, e.g. in the form of a warning light, which warns the vehicle driver that the catalyzer is defective and has to be replaced.

SUMMARY OF THE INVENTION

In accordance with the present invention, these and other objects have now been realized by the invention of apparatus for the catalytic purification of exhaust gases which comprises a housing, an inlet for supplying the exhaust gases to the housing, the inlet having a first end distal from the housing and a second end proximate to the housing, a first catalyzer unit having a first cross-sectional area located within the housing adjacent to the second end of the inlet, the first catalyzer unit having a longitudinal axis, and a second catalyzer unit having a second cross-sectional area located within the housing downstream of the first catalyzer unit, the first cross-sectional area being less than the second cross-sectional area, the second end of the inlet being disposed at an angle with respect to the longitudinal axis of the first catalyzer unit. Preferably, the apparatus includes a third catalyzer unit located within the housing downstream of the second catalyzer unit.

In accordance with one embodiment of the apparatus of the present invention, the second catalyzer unit has a substantially oval cross-section.

In accordance with another embodiment of the apparatus of the present invention, the first catalyzer unit has a substantially circular cross-section.

In accordance with one embodiment of the apparatus of the present invention, the ratio of the size of the first catalyzer unit to the second catalyzer unit is between about 0.5:3 and 2.9:3, and preferably is about 2:3.

In accordance with another embodiment of the apparatus of the present invention, the first catalyzer unit includes a plurality of longitudinally extending channels and the second catalyzer unit has a longitudinal axis, and the direction of the longitudinally extending channels of the first catalyzer unit substantially coincides with the longitudinal axis of the second catalyzer unit.

In accordance with another embodiment of the apparatus of the present invention, the apparatus includes a first lambda sensor located upstream of the first catalyzer unit and a second lambda sensor located downstream of the first catalyzer unit.

In accordance with another embodiment of the apparatus of the present invention, the first catalyzer unit has a first symmetry with respect to the longitudinal axis and the second catalyzer unit has a second symmetry with respect to the longitudinal axis of the catalyzer unit, and the longitudinal axis of the first catalyzer unit is displaced perpendicular with respect to the longitudinal axis of the second catalyzer unit.

In accordance with another embodiment of the apparatus of the present invention, the angle of the inlet with respect to the longitudinal axis of the first catalyzer unit is between about 10° and 40°, and preferably about 20°.

It has thus been found that by arranging a relatively small first catalyzer upstream of the ordinary catalyzer and by permitting the exhaust gases to be incident at an angle to this first catalyzer, an effective purification effect on the entire catalyzer arrangement is achieved.

BRIEF DESCRIPTION OF THE DRAWINGS

The present invention may be more fully appreciated with reference to the following detailed description, which, in turn, refers to the Figures, in which:

FIG. 4 is a partial, side, partially sectional, enlarged view of a portion of the apparatus shown in FIG. 1;

FIG. 5 is a side, elevational view of another embodiment of the apparatus of the present invention;

FIG. 6 is a side, elevational view of apparatus similar to the apparatus shown in FIG. 1 provided with lambda sensors for diagnosing the operation of the catalyzer arrangement;

FIG. 7 is a top, elevational view of another embodiment of the apparatus of the present invention; and FIG. 8 is a side, elevational, cross-sectional view of the apparatus shown in FIG. 7 taken along line B—B thereof.

DETAILED DESCRIPTION

Figure 1:
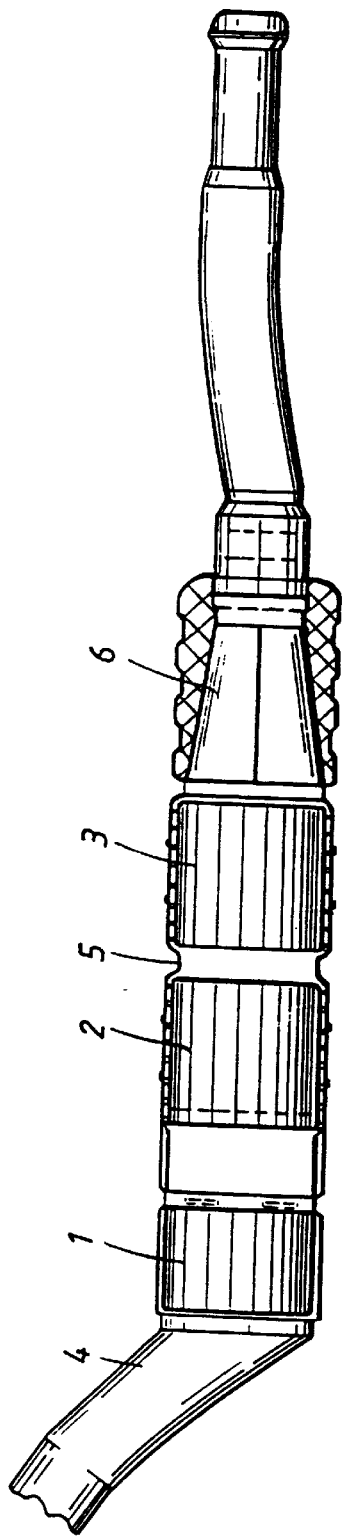
FIG. 1 is a side, elevational view of apparatus in accordance with the present invention.

Referring to the Figures, in which like reference numerals refer to the elements thereof, FIG. 1 shows a side view of an arrangement in accordance with the present invention. According to a preferred embodiment, the arrangement comprises a catalytic exhaust gas purifier with a first monolithic catalyzer unit 1. Downstream of the first catalyzer 1 there is a main catalyzer which comprises a second monolithic catalyzer 2 and a third monolithic catalyzer 3.

The first catalyzer 1 is preferably composed of a metallic catalyzer which has a circular cross-section with about 98 mm diameter and a length of between 74 and 90 mm, as well as a cell density of the order of 200 cpsi (cells per square inch). A metallic catalyzer has the advantage that it has a considerably larger catalytic active area than a ceramic catalyzer. Another advantage is that the energy is transported quickly from this to the second catalyzer 2. The second catalyzer 2 and the third catalyzer 3 are preferably composed of similar ceramic catalyzers of the monolithic, three-way catalyzer type. Other types of catalyzers are also possible. The two catalyzers, 2 and 3, are formed so that their size and cell-density are substantially the same, while other parameters such as length and type of catalytic coating can be different.

An inlet channel 4 is arranged upstream of the first catalyzer 1. The exhaust gases flow through the inlet channel 4 from a combustion engine of conventional type (not shown). The part of the inlet channel 4 which lies closest to the first catalyzer 1 is somewhat widened, which gives an optimal flow of the exhaust gases through the inlet channel 4. The inlet channel 4 presents an angle with respect to the longitudinal direction of the catalyzers, 1, 2 and 3, which lies between about 10° and 40°, preferably about 20°. The complete arrangement is enclosed in a common casing 5 of metal. The arrangement also includes an outlet channel 6, through which the exhaust gases flow when they have passed through all of the catalyzers, 1, 2 and 3. The outlet channel 6 is preferably formed as a straight, relatively long conical section. This arrangement is advantageous with respect to the flow characteristics of the exhaust gases at the outlet of the catalyzer arrangement.

Figure 2:
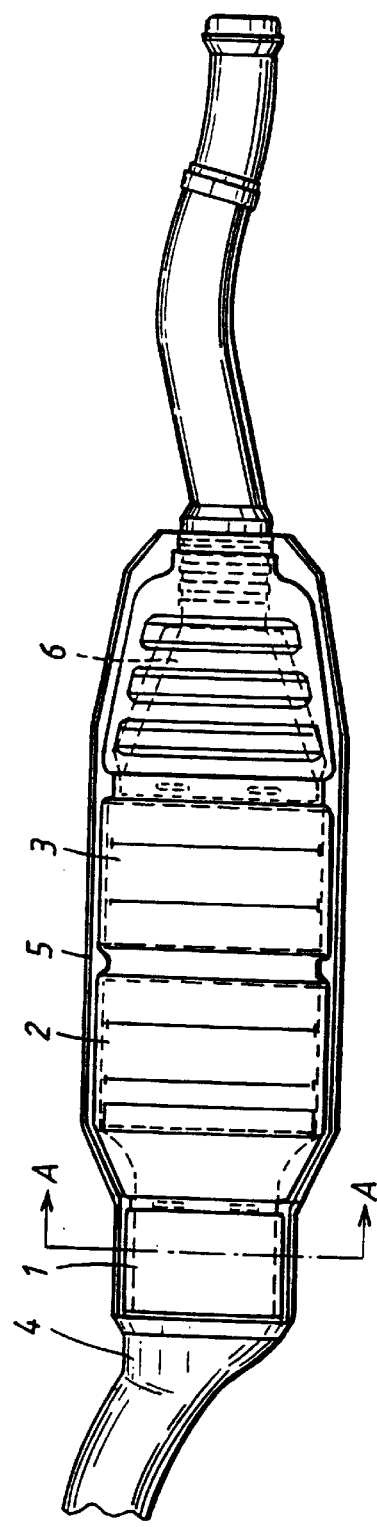
FIG. 2 is a top, elevational view of the apparatus shown in FIG. 1.
Figure 3:
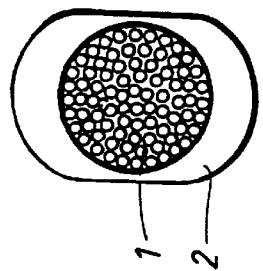
FIG. 3 is a side, elevational, sectional view of the apparatus shown in FIG. 2 taken along line A—A thereof.

FIG. 2 shows a view from above of the arrangement according to the present invention. From this Figure, as well as from FIG. 3 which is a cross-sectional view along section A—A in FIG. 2, it is clear that the second catalyzer 2 and the third catalyzer 3 have a substantially oval cross-section.

The complete function of the catalyzer arrangement will now be described. The first catalyzer 1 has a considerably smaller cross-sectional area than the second and third catalyzers, 2 and 3. The ratio between the size of the cross-sectional area of the first catalyzer 1 and the second catalyzer 2 is between about 0.5:3 and 2.9:3, preferably about 2:3. The first catalyzer 1 also has a relatively small volume. This means that it is heated up relatively quickly due to the heat from the exhaust gases and the heat from the catalytic reaction in the catalyzer 1. Thus, a catalytic reaction will be started up quickly in the first catalyzer 1.

Since the cross-sectional area of the first catalyzer 1 is less than the cross-sectional area of the following second catalyzer 2, the exothermic heat of the exhaust gas flow out of the first catalyzer 1 will be concentrated to a certain extent in the second catalyzer 2. This means, in turn, that a particular central part of the second catalyzer 2 will be heated up relatively quickly, whereby the catalytic reaction can also start up more rapidly in the second catalyzer 2. The second catalyzer 2 is a ceramic catalyzer which has a lower thermal conductivity than the first catalyzer 1, which is a metallic catalyzer. This contributes to an efficient operation of the entire catalyzer arrangement.

As can be seen in FIGS. 1 and 2, the inlet channel 4 is angled with respect to the longitudinal axis of symmetry of the first catalyzer 1. This means that the cross-sectional area through the inlet channel 4 is less than the cross-sectional area for the frontal surface of the first catalyzer 1, onto which the exhaust gases are incident. In this manner, a turbulent flow in front of the first catalyzer 1 is avoided and instead a laminar flow of the exhaust gases through the inlet channel 4 if obtained up until they reach the first catalyzer 1.

When the flowing exhaust gases reach the first catalyzer 1 they will "collide" with the walls of the catalyzer 1. This process is shown in FIG. 4, which is an enlarged partial view of a portion of the inlet channel 4 and the first catalyzer 1. The first catalyzer 1 is, in a known manner, formed with a number of longitudinal channels, of which three channels, 7, 8 and 9, are shown in FIG. 4. According to this embodiment, the channels, 7, 8 and 9, are substantially straight, i.e. they follow the longitudinal direction of the catalyzer 1, but they can also have another form, e.g. a curved shape or a zigzag shape. The exhaust gas flow is shown schematically with arrows, 10, 11 and 12, respectively. The exhaust gas stream/flow, as mentioned above, has a laminar flow through the inlet channel 4. When the exhaust gas flow is incident on the channels, 7, 8 and 9, the laminar flow effectively goes through a transition to a turbulent flow. This is indicated in FIG. 4 with "turbulent" flow lines, 13, 14 and 15. The transition from laminar to turbulent flow occurs as a result of the inlet channel 4 being angled, both in the height direction and the sideways direction, with respect to the longitudinal direction of the first catalyzer 1. The turbulent flow gives rise to a rapid heating of the first catalyzer 1, due to which its catalytic reaction can start quickly.

Further downstream in the first catalyzer 1, the turbulent flow again goes through a transition to a laminar flow.

FIG. 5 shows a side view of an alternative embodiment of the present invention. As in the aforementioned embodiment, it comprises a comparatively small first catalyzer 1 and a main catalyzer comprising a second catalyzer 2 and a third catalyzer 3. Additionally, it comprises an inlet channel 4 which is slanted with respect to the first catalyzer 1. In this manner, a zone having turbulent flow is obtained at the inlet to the first catalyzer 1, similar to that which has been described above. This alternative embodiment also comprises a casing 5 with an intermediate portion 16 which is arranged between the first catalyzer 1 and the second catalyzer 2. The first catalyzer 1 is somewhat slanted with respect to the intermediate portion 16, i.e. the longitudinal axis 20 of symmetry of the first catalyzer 19 forms an angle with respect to the longitudinal axis 20 of symmetry of the intermediate portion 16. Additionally, the intermediate portion 16 is formed so that its longitudinal axis of symmetry forms an angle to the longitudinal axis of symmetry of the second catalyzer 2. In this manner, a zone with turbulent flow is also formed at the inlet to the second catalyzer 2. This assists in giving an increased efficiency of the entire catalyzer arrangement by the second catalyzer 2 having a shorter light-off time.

FIG. 6 is a side view of a further embodiment of the present invention which is similar to that shown in FIG. 1, but which further comprises two lambda sensors 17 and 18, which can be used for measuring the degree of conversion of the catalyzer arrangement. A lambda sensor is a type of sensor which produces an electrical signal which varies with the oxygen content of the exhaust gases. A first lambda sensor 17 is arranged in front of the first catalyzer 1 and a second lambda sensor is arranged after the third catalyzer 3.

Both of the lambda sensors, 17 and 18, are also connected to an analyzer unit (not shown) which, on the basis of signals from the lambda sensors, 17 and 18, can calculate a value for the degree of conversion of the catalyzer arrangement, i.e. its purification ability. In the event that the analysis unit determines that the purification ability of the catalyzer arrangement is much too low, an alarm signal can be activated. Such a signal can comprise e.g. a warning light on the motor vehicle's instrument panel. The driver of the vehicle can thus be made aware that the catalyzer arrangement needs to be replaced.

A special problem can arise if the catalytic active coating of the catalyzers has a high oxygen storage capacity, which can sometimes be the case with modern catalyzers. This leads to the following problem arising during a diagnosis with the aid of the lambda sensors, 17 and 18. If the second lambda sensor 18 is placed in the outlet channel 6 (see FIG. 6), and the catalyzers, 1, 2 and 3, arranged upstream have a high oxygen storage capacity, only a small amount of oxygen will be available at the second lambda sensor 18. This means that the signal from the second lambda sensor 18 becomes unstable and can vary greatly. In the worst case, the signal can be interpreted by the analyzer unit as being a signal indicating a malfunctioning catalyzer. In order to solve this problem, the second lambda sensor 18 can be arranged in a different location rather than after the third catalyzer 3, e.g. between the first catalyzer 1 and the second catalyzer 2 or between the second catalyzer 2 and the third catalyzer 3. In this manner, reliable measurements can be obtained.

In the event that it is desired to place the second lambda sensor 18 as close as possible downstream of the first catalyzer 1, problems can arise concerning the space which is available in the vehicles. In order to solve this problem, the first catalyzer 1 can be arranged somewhat displaced in the sideways direction, i.e. with respect to the symmetrical longitudinal axis of the second catalyzer 2. This arrangement is shown in FIG. 7.

The function of this arrangement is ensured as long as the first catalyzer 1 is not displaced further out to the side than the point where its outlet flow ends up inside the oval cross-section of the second catalyzer 2. FIG. 8, which shows a cross-section along line B—B in FIG. 7, defines a possible placement of the first catalyzer 1 with respect to the second catalyzer 2.

What is stated above concerning the arrangement of the lambda sensors, 17 and 18, can of course also be applied in connection with the embodiment which is shown in FIG. 5.

The present invention is not limited to the embodiments described above, but can be varied within the scope of the appended claims. For example, different types of catalyzer can be used. Moreover, the catalyzers, 1, 2 and 3, can have different dimensions and shapes.

The main catalyzer can constitute a single catalyzer instead of the two above-mentioned catalyzers, 2 and 3.

Moreover, the first catalyzer 1 can be combined with a so-called HC-trap or an electrically heatable catalyzer, e.g. an electrical start-catalyzer or a gas burner. In this manner, an additional improvement of the purification efficiency can be achieved.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. Apparatus for the catalytic purification of exhaust cases comprising a housing, an inlet for supplying said exhaust gases to said housing, said inlet having a first end distal from said housing and a second end proximate to said housing, a first catalyzer unit having a first cross-sectional area located within said housing adjacent to said second end of said inlet, said first catalyzer unit having a longitudinal axis, and a second catalyzer unit having a second cross-sectional area located within said housing downstream of said first catalyzer unit, said first cross-sectional area being less than said second cross-sectional area, said second end of said inlet being disposed at an angle with respect to said longitudinal axis of said first catalyzer unit.

2. The apparatus of claim 1 including a third catalyzer unit located within said housing downstream of said second catalyzer unit.

3. The apparatus of claim 1 wherein said second catalyzer unit has a substantially oval cross-section.

4. The apparatus of claim 1 wherein said first catalyzer unit has a substantially circular cross-section.

5. The apparatus of claim 1 wherein the ratio of the size of said first catalyzer unit to said second catalyzer unit is between about 0.5:3 and 2.9:3.

6. The apparatus of claim 5 wherein said ratio of said size of said first catalyzer unit to said second catalyzer unit is about 2:3.

7. The apparatus of claim 1 wherein said first catalyzer unit includes a plurality of longitudinally extending channels and said second catalyzer unit has a longitudinal axis, and wherein the direction of said longitudinally extending channels of said first catalyzer unit substantially coincides with the longitudinal axis of said second catalyzer unit.

8. The apparatus of claim 1 including a first lambda sensor located upstream of said first catalyzer unit and a second lambda sensor located downstream of said first catalyzer unit.

9. The apparatus of claim 1 wherein said first catalyzer unit has a first symmetry with respect to said longitudinal axis and said second catalyzer unit has a second symmetry with respect to said longitudinal axis of said second catalyzer unit, and wherein said longitudinal axis of said first catalyzer unit is displaced perpendicularly with respect to said longitudinal axis of said second catalyzer unit.

10. The apparatus of claim 1 wherein said angle of said inlet with respect to said longitudinal axis of said first catalyzer unit is between about 10° and 40°.

11. The apparatus of claim 10 wherein said angle of said inlet with respect to said longitudinal axis of said first catalyzer unit is about 20°.

* * * * *

UNITED STATES PATENT AND TRADEMARK OFFICE
CERTIFICATE OF CORRECTION

PATENT NO. : 5,996,339
DATED : December 7, 1999
INVENTOR(S) : Gottberg et al.

It is certified that error appears in the above-identified patent and that said Letters Patent is hereby corrected as shown below:

Column 4, line 19, "4 if obtained" should read --4 is obtained--.

Column 4, line 58, "catalyzer 19" should read --catalyer 1--.

Column 4, line 59, "longitudinal axis 20" should read --longitudinal axis 19--.

Column 6, line 16, "of exhaust cases" should read --of exhaust gases--.

Signed and Sealed this

Nineteenth Day of September, 2000

*Attest:*

Q. TODD DICKINSON

*Attesting Officer*  *Director of Patents and Trademarks*